US006832247B1

(12) United States Patent
Cochran et al.

(10) Patent No.: US 6,832,247 B1
(45) Date of Patent: Dec. 14, 2004

(54) METHOD AND APPARATUS FOR AUTOMATIC MONITORING OF SIMPLE NETWORK MANAGEMENT PROTOCOL MANAGEABLE DEVICES

(75) Inventors: Charles W. Cochran, Houston, TX (US); Justin E. York, Houston, TX (US); Geoffery A. Schunicht, Spring, TX (US); Peter A. Hansen, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/098,027

(22) Filed: Jun. 15, 1998

(51) Int. Cl.[7] .............................................. G06F 15/173
(52) U.S. Cl. ...................... 709/223; 709/222; 709/224; 705/9
(58) Field of Search ................................. 709/226, 104, 709/206, 203, 207, 220, 222–224; 395/500; 707/100, 3; 379/34; 713/201; 705/9, 14

(56) References Cited

U.S. PATENT DOCUMENTS

| | | | | |
|---|---|---|---|---|
| 5,781,108 A | * | 7/1998 | Jacob et al. ................. | 340/552 |
| 5,787,252 A | * | 7/1998 | Schettler et al. ............ | 709/224 |
| 5,822,535 A | * | 10/1998 | Takase et al. ................ | 709/226 |
| 5,870,698 A | * | 2/1999 | Riedel et al. ................ | 702/182 |
| 5,870,713 A | * | 2/1999 | Haneda et al. ................. | 705/9 |
| 5,872,928 A | * | 2/1999 | Lewis et al. ................. | 709/222 |
| 5,889,953 A | * | 3/1999 | Thebaut et al. .............. | 709/231 |
| 5,907,696 A | * | 5/1999 | Stilwell et al. .............. | 395/500 |
| 5,909,549 A | * | 6/1999 | Compliment et al. ....... | 709/223 |
| 5,913,037 A | * | 6/1999 | Spofford et al. ............ | 709/226 |
| 5,922,051 A | * | 7/1999 | Sidey ......................... | 709/223 |
| 5,958,012 A | * | 9/1999 | Battat et al. ................. | 709/224 |
| 5,963,949 A | * | 10/1999 | Gupta et al. ................. | 707/100 |
| 6,003,077 A | * | 12/1999 | Bawden et al. ............. | 709/223 |
| 6,003,078 A | * | 12/1999 | Kodimer et al. ............ | 709/224 |

(List continued on next page.)

OTHER PUBLICATIONS

TMN Specification Support Oct. 1997.*
Network Node Manager 5.0 Release Notes 1997.*
rfc1470—FYI on a Network Management Tool Catalog: Tools for Monitoring and Debugging TCP/IP Internets and Interconnected . . . ; www.gusw.net/doc/rfc/rfc–html/rfc1470.html.*
www.ietf.org.rfc/rfc1513.txt;www.ietf.org/rfc/rfc1513.txt.*
Interpreting Variables of the Oracle Database MIB; www.kates.org/links/11/179.*
Configuring Oracle SNMP Support; http://oradb1.jinr.ru/oracle/srvr/net/doc/NWUS233/ch6.htm.*
3COM, transcend Enterprise Manager Inventory Manager USer Guide, http:/www.3com.com.*

*Primary Examiner*—Phong Vu (57) ABSTRACT

A method and apparatus for automatically monitoring Simple Network Manageable Devices. A processor accesses a memory storage device to retrieve a device definition file and an interface definition file associated with each interface referenced in the device definition file. The processor creates a Device-Type-Specific Formula-Monitor Definitions (DTSFMD) data structure based on information contained within the device definition file and the interface definition files and stores the DTSFMD data structure in the storage device. The processor accesses a communication network to retrieve information used to identify the types of devices and associated interfaces located within the communication network. Based on the retrieved information, the devices are identified as a router, a switch, a repeater or a device for which no monitoring is to occur. Based on the retrieved information and requirements established in the DTSFMD, the processor determines which interfaces are to be monitored and how they are to be monitored and automatically performs monitoring to generate data for graphical displays and the setting and clearing alarms.

10 Claims, 5 Drawing Sheets

U.S. PATENT DOCUMENTS

| | | | | |
|---|---|---|---|---|
| 6,012,152 A | * | 1/2000 | Douik et al. | 714/6 |
| 6,018,567 A | * | 1/2000 | Dulman | 379/34 |
| 6,026,440 A | * | 2/2000 | Shrader et al. | 709/224 |
| 6,049,826 A | * | 4/2000 | Beser | 709/222 |
| 6,065,138 A | * | 5/2000 | Gould et al. | 714/47 |
| 6,070,244 A | * | 5/2000 | Orchier et al. | 713/201 |
| 6,085,240 A | * | 7/2000 | Suzuki et al. | 709/223 |
| 6,112,237 A | * | 8/2000 | Donaldson et al. | 709/224 |
| 6,175,866 B1 | * | 1/2001 | Holloway et al. | 709/223 |
| 6,181,776 B1 | * | 1/2001 | Crossley et al. | 379/32.01 |
| 6,182,157 B1 | * | 1/2001 | Schlener et al. | 709/318 |
| 6,237,114 B1 | * | 5/2001 | Woodkey et al. | 714/47 |
| 6,272,537 B1 | * | 8/2001 | Kekic et al. | 709/223 |
| 6,295,527 B1 | * | 9/2001 | McCormack et al. | 707/3 |
| 6,389,464 B1 | * | 5/2002 | Krishnamurthy et al. | 709/220 |

* cited by examiner

METHOD AND APPARATUS FOR AUTOMATIC MONITORING OF SIMPLE NETWORK MANAGEMENT PROTOCOL MANAGEABLE DEVICES

CROSS REFERENCE TO RELATED APPLICATIONS

This application is related to the following U.S. Patent Applications:

U.S. application Ser. No. 09/098,030 entitled "Method and Apparatus for Graphical Display of Multiple Network Monitors over Multiple Intervals", filed Jun. 15, 1998, pending;

U.S. application Ser. No. 09/098,016 entitled "Method and Apparatus for Sending Address in the Message for an E-Mail Notification Action to Facilitate Remote Management of Network Devices", filed Jun. 15, 1998, pending;

U.S. application Ser. No. 09/098,031 entitled "Method and Apparatus for Verifying Network Devices using Simple Network Management Protocol", filed Jun. 15, 1998, pending; and U.S. application Ser. No. 09/098,026 entitled "Method and Apparatus for Discovering Network Devices using Internet Protocol and Producing a Corresponding Graphical Network Map", filed Jun. 15, 1998, pending.

All of the above applications are assigned to the assignee of the present invention, and are hereby incorporated herein in their entirety by this reference thereto.

FIELD OF THE INVENTION

The present invention pertains in general to monitoring of computer networks, and more particularly, but not by way of limitation, to a method and apparatus for automatically monitoring devices which are connected to a communication network and are manageable using Simple Network Management Protocol.

BACKGROUND OF THE INVENTION

Communication networks are changing the way people communicate, distribute, and share information. There are many different ways information can be accessed, shared, or communicated on a network. For example, networks are used to access software applications running on a file server, to send e-mail to someone in another country, and to access information on remote computer servers. Networks consist of many different devices connected together in some form to allow one device to benefit from another. These devices include, but are not limited to, switches, routers, repeaters, hubs, terminals, servers, queuing devices, and peripheral equipment such as printers, modems, and scanners. Communication networks allow the user to access remote programs and remote databases either of the same organization or from other enterprises or public sources. They also provide communication possibilities faster than other facilities. Because of these optimal information and communication possibilities, computer networks often increase the organizational learning rate, which many authors declare as a fundamental advantage in competition.

These benefits, however, do not come without their problems. Network systems can be very complex with complex problems which are difficult to identify and solve. To help identify network problems and solutions, network management tools have been developed to monitor networks and identify problems or potential problems associated with the networks.

A limitation of current network management tools is that they do not provide the user with meaningful or valuable monitoring of networks. Using current network management tools, a user manually configures specific attributes for monitoring each device interface within the communication network. Furthermore, the user is required to configure meaningful thresholds for each of the configured monitor attributes. Without substantial expertise and a great deal of time to configure the network management tools, the user is unlikely to select correct attributes and thresholds to provide meaningful data, and thus, the network management tools are unable to do anything more than indicate whether devices within the communication network are dead or alive. It is widely known that users believe that performing network management is too difficult and time consuming, and therefore, make no attempt at network monitoring.

It would be advantageous, therefore, to devise a method and apparatus for providing a user with automatic monitoring of devices residing within a communication network. It would further be advantageous if such a method and apparatus automatically selected the attributes, associated thresholds and formulas for monitoring each type of interface on each type of device residing within the communication network.

SUMMARY OF THE INVENTION

The present invention comprises a method and apparatus for automatically monitoring Simple Network Management Protocol (SNMP) manageable devices. A processor accesses a memory storage device to retrieve a device definition file and an interface definition file associated with each interface referenced in the device definition file. The processor creates a Device-Type-Specific Formula-Monitor Definitions (DTSFMD) data structure based on information contained within the device definition file and the interface definition files and stores the DTSFMD data structure in the storage device.

The processor accesses a communication network to retrieve information used to identify the types of devices and associated interfaces located within the communication network. Based on the retrieved information, the devices are identified as a router, a switch, a repeater or a device for which no monitoring is to occur. Based on the retrieved information and requirements established in the DTSFMD, the processor determines which interfaces are to be monitored and how they are to be monitored and automatically performs monitoring to generate data for graphical displays and the setting and clearing of alarms.

BRIEF DESCRIPTION OF THE DRAWINGS

A more complete understanding of the present invention may be had by reference to the following Detailed Description and appended claims, when taken in conjunction with the accompanying Drawings wherein:

DETAILED DESCRIPTION

An example of the utilization of the present invention can be found in Compaq's Netelligent Management Software, the user guide of which (5th edition) (Attachment A) is incorporated herein by reference.

Figure 1:
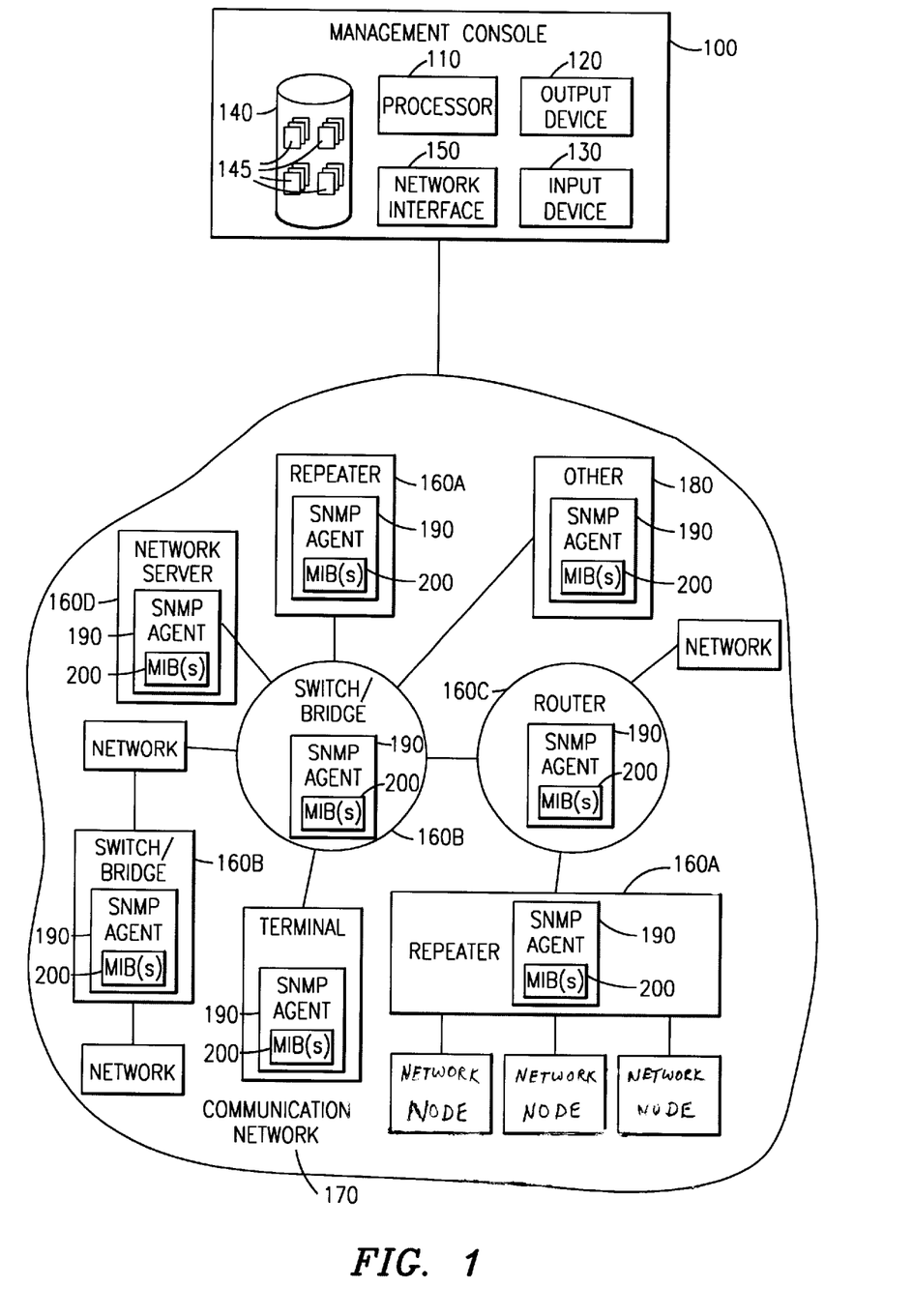
FIG. 1 is a functional block diagram of an apparatus for effectuating automatic monitoring of Simple Network Management Protocol manageable devices.
Figure 2A:
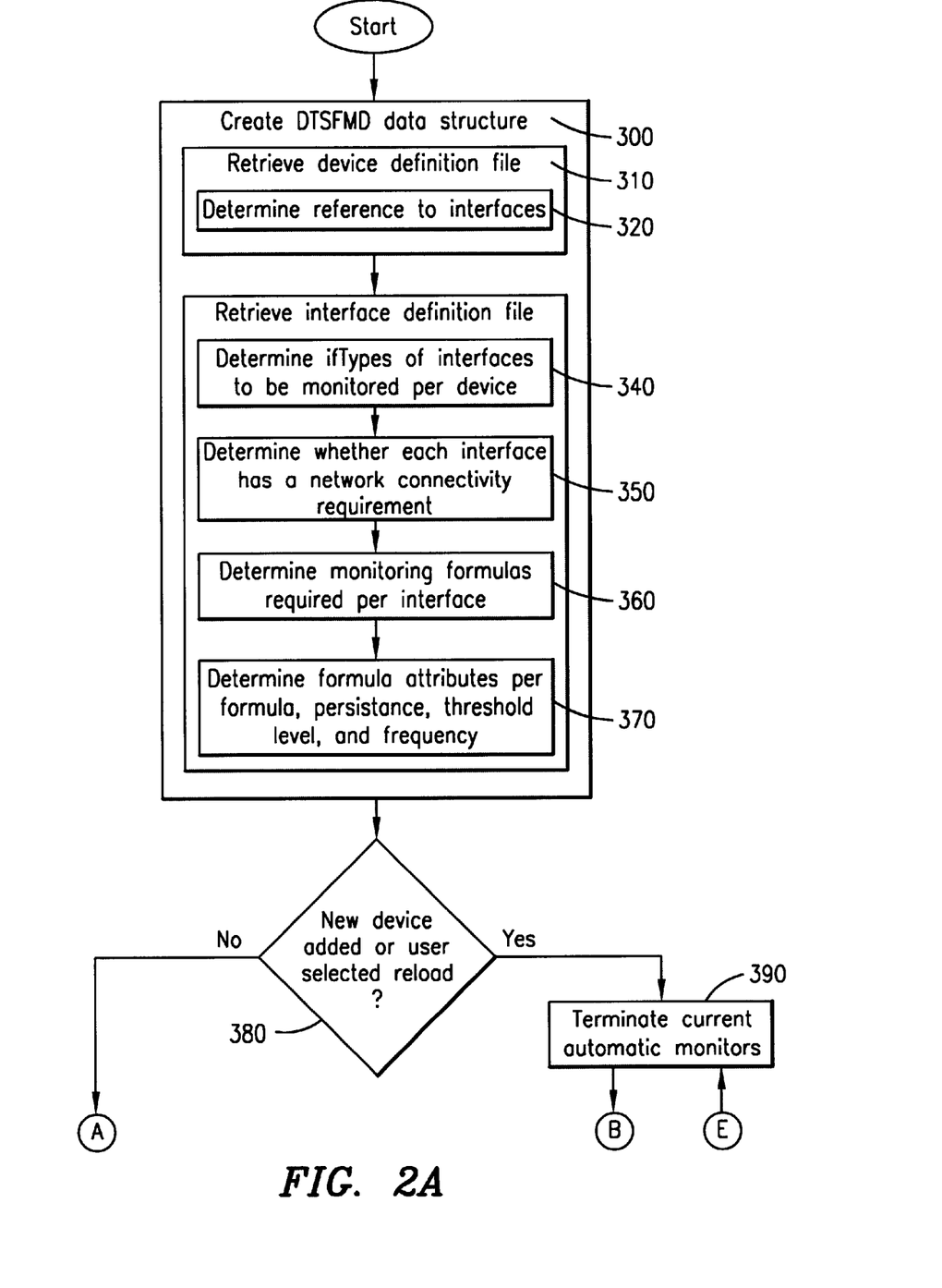
FIGS. 2A–2D is a flow diagram of a method for effectuating automatic monitoring of Simple Network Management Protocol manageable devices consistent with the apparatus described in FIG. 1.
Figure 2B:
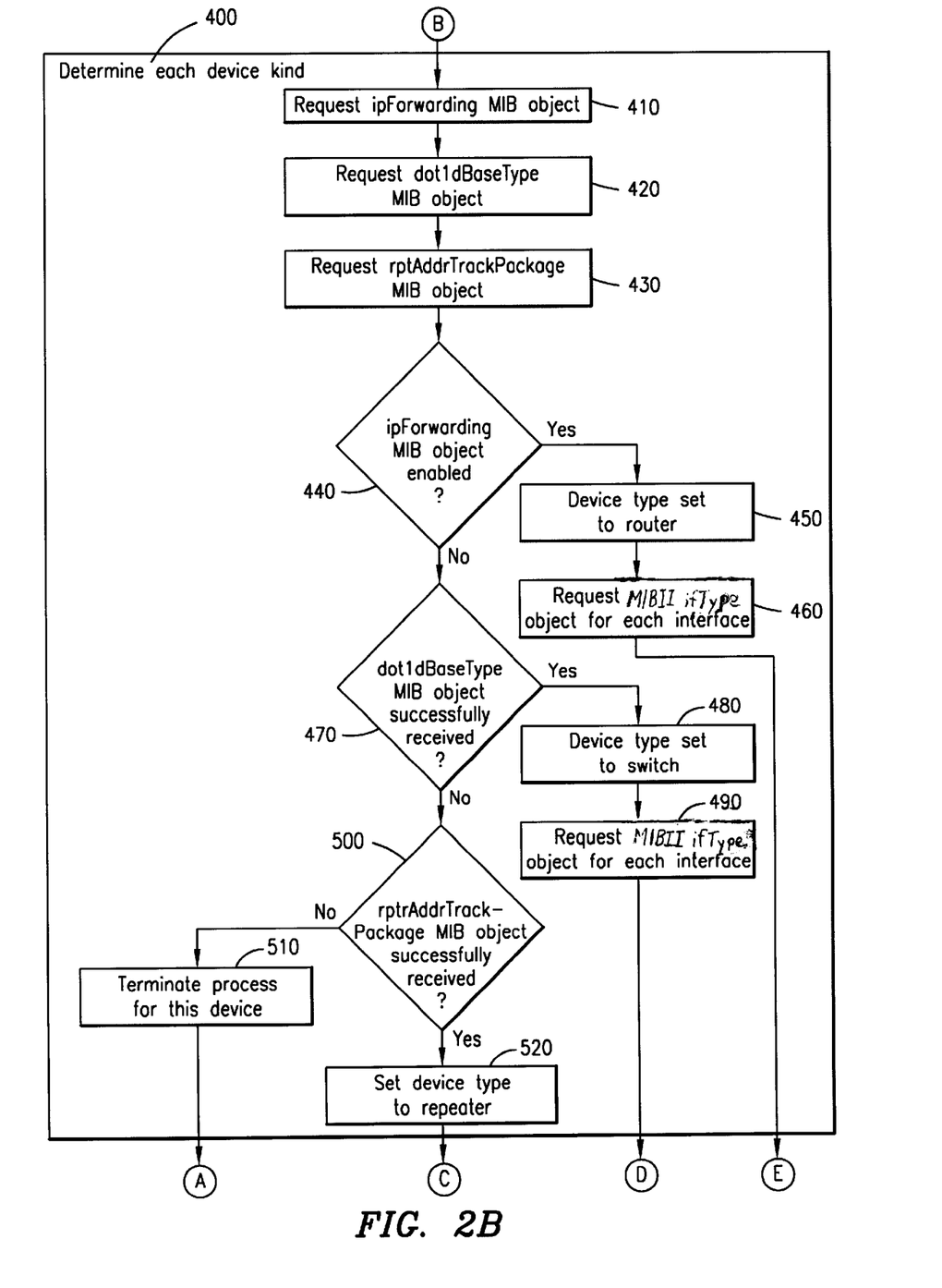
Figure 2C:
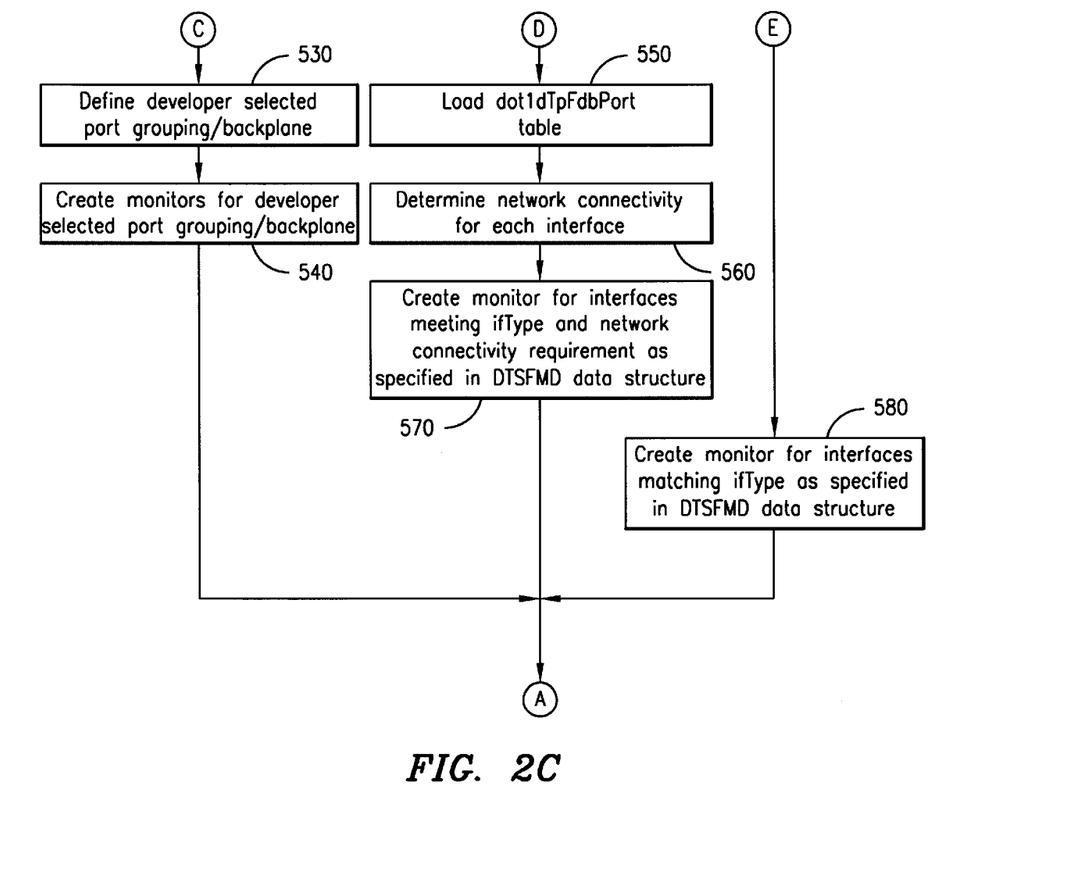
Figure 2D:
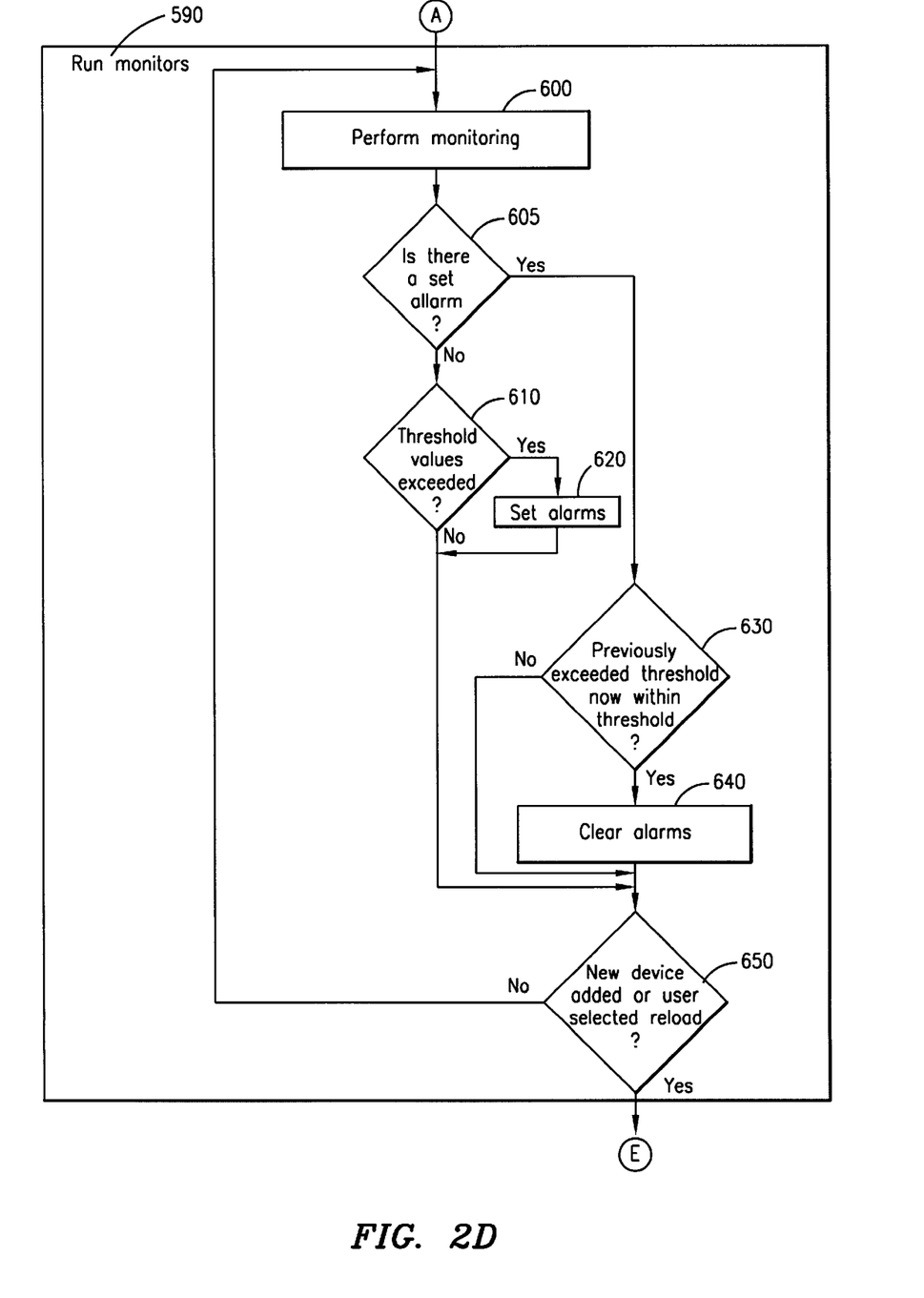

Referring now to FIG. 1, there is illustrated a functional block diagram of an apparatus for effectuating automatic monitoring of Simple Network Management Protocol manageable devices. A management console 100 comprising a processor 110, an output device 120 such as a video display or a printer, and input device 130 such as a keyboard or floppy disk drive, a storage device 140 such as Random Access Memory (RAM) or a disk drive, and a network interface 150 communicates with various network devices 160 and other devices 180 across a communication network 170.

Various network devices 160 reside within the communication network 170 and are manageable using Simple Network Management Protocol (SNMP). SNMP is a communication network management protocol which is commonly known in the industry and is incorporated by reference to its fullest extent hereto. SNMP defines a set of variables that an entity in a communication network maintains and consists of three parts: a Structure of Management Information (SMI), Management Information Base (MIB) and the protocol itself The MIBs implemented by an SNMP agent 190 also include MIBII which is a particular instance of a MIB. Although various versions of SNMP may exist, the present invention is equally applicable to each version.

The network devices 160 include, but are not limited to, such devices as repeaters 160A, switch/bridges 160B, routers 160C and network servers 160D. Various other devices 180 may also reside within the communication network 170 which are manageable using SNMP but which are not necessarily "communication network" type devices. Examples of other devices 180 include, but are not limited to workstations and printers.

Within each SNMP manageable device, which includes network devices 160 and other devices 180, resides the SNMP agent 190. The SNMP agent 190 implements one or more MIB(s) including MIBII 200 which define the set of variables or databases needed to monitor and control components in the communication network 170 such as, but not limited to, the network devices 160 and other devices 1180. Using SNMP, the processor 110 located within the management console 100 accesses the SNMP agents 190 to retrieve information contained within the MIBs 200 and to effectuate automatic monitoring of the network devices 160 and other devices 180. The processor 110 stores the information within storage files 145 located within the storage device 140.

In the present invention, a user is provided with three persistence levels for monitoring of network devices 160 and other devices 180 (hereinafter referred to as device(s)) within the communication network 170. The three levels include aggressive, moderate and passive and are applicable to various attributes in the monitoring. Although the present invention is described as including three persistence levels, it is understood that the present invention may include any number of persistence levels.

A frequency of a monitor is the frequency at which the monitor performs monitoring. For example, if the monitor has a frequency of three hundred, the monitor performs monitoring calculations once every three hundred seconds. Given the three persistence levels, the present invention is capable of monitoring at three different frequencies. For example, the passive persistence level associated with the frequency attribute is set to once every ten minutes, the moderate persistence level is set to once every five minutes, and the aggressive level is set to once every two minutes. If the user initially sets the monitoring at the moderate persistence level but later decides that too many problems are going undetected, the user can instead select aggressive monitoring to "catch" more problems. Using the present invention, the user need not know the frequency of monitoring other than that selecting a more aggressive persistence level increases the degree of monitoring.

Alarm thresholds are values at which an alarm is set or cleared. In the present invention, there are three levels of alarms, a critical alarm, a major alarm, and a minor alarm with each level of alarm being associated with three persistence levels. Thus, there is a set value and a clear value for each level of alarm and also for each of the three persistence levels resulting in total of eighteen values. As an example, a monitor is defined to monitor utilization on an Ethernet link. Each time the monitor is sampled (according to the frequency dictated by the frequency associated with the selected persistence level) a value representing a percentage utilization of the link is obtained. If the utilization crosses above the threshold value for the major alarm associated with the selected persistence level, the major alarm is activated.

In the description of the alarm threshold described above, it is implied that if a sampled monitor exceeds or falls below a threshold value an alarm is set or cleared. In the preferred embodiment of the present invention, however, the poll interval attribute defines the number of consecutive occurrences for which the sampled monitor exceeds the threshold value before the alarm is set. Again, the present invention includes three poll interval persistence levels. For example, the passive, moderate and aggressive poll interval levels can be set to three consecutive occurrences, two consecutive occurrences and one occurrence respectively. Although in the preferred embodiment of the present invention an alarm is cleared on a single occupance of a sampled monitor falling below the alarm threshold, it is understood that clearing of an alarm can be effectuated in the same manner as the setting of alarms using a poll interval level.

All devices are categorized according to a "device type." For each device type, a device definition file defines interface definition files to be used for the particular device type. An interface is defined as any grouping of network interfaces such as, but not limited to, a port, a group of ports such as a backplane tied across a number of ports, or a stack of communication devices.

Each interface definition file defines the following information: the kind of interface which is to be monitored for each type of device as defined in the ifType variable contained within MIBII 200, a network connectivity requirement, formulas used to monitor each interface, and the threshold values, such as, but not limited to set and clear values for critical major and minor alarms, associated with aggressive, moderate and passive monitoring for each formula. Each of the formulas is stored in a formula definition file and contains information about which MIB 200 objects need to be loaded and how they are combined to form the formulas. The network connectivity requirement defines whether the network connectivity threshold must be met for monitoring to occur. The network connectivity threshold defines the number of network connections existing on an interface. Network connectivity is a factor in monitoring the network in that if all interfaces were monitored, monitoring would be performed on interfaces having as little as one connection to the network 170. Such extensive monitoring would result in a degradation in the performance of the network 170.

Referring additionally now to FIGS. 2A–2D, there is illustrated a flow diagram of a method for effectuating automatic monitoring of Simple Network Management Protocol manageable devices consistent with the apparatus described in FIG. 1. To implement the present invention, a Device-Type-Specific Formula-Monitor Definitions (DTSFMD) data structure is created (step 300). The DTSFMD data structure is created by retrieving the device definition files (step 310), which determines references to the interfaces (step 320), and then retrieving the interface definition files (step 330) Retrieving the interface definition files determines ifTypes of interfaces to be monitored per device (step 340), determines each interface connectivity requirement (step 350), determines monitoring formulas required per interface (step 360) and also determines formula attributes, value threshold levels, and frequencies per formula per persistence level (step 370).

A determination is made as to whether a new device has been added to be monitored or the user has selected to reload the monitors (step 380). If, in step 380, a determination is made that a new device has been added to the network 170 or the user has selected to reload the monitors, any currently existing automatic monitors are terminated for that device (step 390) and a determination as to what kind of device each device is (step 400). For each device, a request is made for an ipForwarding MIB object 200 (step 410), a request is made for a dot 1 dBaseType MIB object 200 (step 420) and a request is made for a rptAddrTrackPackage MIB object 200 (step 430).

To determine what kind of device each device is, a determination is made as to whether the received ipForwarding MIB object 200 of the device is enabled (step 440), and if so, a device type parameter is set to indicate the device as a router (step 450) and an MIBII ifType object 200 is requested for each interface associated with the router (step 460).

If, in step 440, a determination is made that the ipForwarding MIB object 200 is not enabled, a determination is made as to whether the dot 1 dBaseType MIB object 200 of the device was retrieved successfully (step 470), and if so, the device type parameter is set to indicate the device as a switch (step 480) and an MIBII ifType object 200 is requested for each interface associated with the switch (step 490).

If, in step 470, a determination is made that the dot1 dBaseType MIB object 200 of the device was not retrieved successfully, a determination is made as to whether the rptrAddrTrackPackage MIB object 200 of the device was retrieved successfully (step 500), and if so, the device type parameter is set to indicate the device as a repeater (step 520).

If, in step 500, a determination is made that the rptrAddrTrackPackage MIB object 200 of the device was not retrieved successfully, the automatic monitoring process for that device is terminated (step 510) and the automatic monitoring process continues for the remaining devices at step 400.

If, in step 500, a determination is made that the device is a repeater and the device type parameter is set in step 520 to indicate the device as a repeater, a developer implementing the automatic monitoring defines a selected port grouping or backplane for the repeater (step 530) and the information identified in step 400 is merged with the DTSFMD data structure created in step 300 to create monitors for the selected port grouping/backplane (step 540).

If the device type parameter in step 490 is set to indicate the device as a switch, then following step 490, the dot1 dTpFdbPort table MIB object 200 is loaded (step 550) and the network connectivity for each interface associated with the device is determined (step 560). Monitors, for interfaces associated with the switch meeting the ifType and/or network connectivity requirements as specified in the DTSFMD data structure, are created (step 570).

If the device type parameter in step 450 is set to indicate the device as a router then following step 460 monitors, for interfaces associated with the router meeting the ifType requirements as specified in the DTSFMD data structure, are created (step 580).

Following steps 540, 570 and 580 or if it is determined in step 380 that a new device was not added and that the user has not selected a reloading of the monitors, the monitors are run (step 590) Each of the automatic monitors performs monitoring (step 600) and a determination is made as to whether there is currently an alarm set (step 605). If it is determined that an alarm is not currently set, a determination is made as to whether any threshold values were exceeded (step 610), and if so, associated alarms are set (step 620).

If, in step 605, it is determined that an alarm is currently set, a determination is made as to whether any previously exceeded threshold values are now within the threshold (step 630), and if so, associated alarms are cleared (step 640).

Following step 640, or if in step 630 it is determined that no previously exceeded threshold values are now within the threshold, or if in step 610 it is determined that no threshold values are exceeded, a determination is made as to whether a new device has been added to be monitored or the user has selected to reload the monitors. (step 650), and if so, the automatic monitor proceeds at step 400, otherwise, monitoring continues at step 600.

Although the preferred embodiment of the apparatus and method of the present invention has been illustrated in the accompanying Drawings and described in the foregoing Detailed Description, it is understood that the invention is not limited to the embodiment disclosed, but is capable of numerous rearrangements, modifications and substitutions without departing from the spirit of the invention as set forth and defined by the following claims.

What is claimed is:

1. A computer system comprising:
    an input device for selecting network devices to be monitored, the selected network devices having specific interfaces that exist based on present connectivity of the network device; and
    a processor for automatically monitoring each selected device, the processor automatically monitoring based upon device identifying information retrieved from each of the network devices to be monitored and information contained within a device definition file that defines classes of devices and interfaces, and by creating a device-specific definitions data structure that is based on the information contained within the device definition file.

2. The computer system of claim 1 wherein the device definition file comprises interface references, and wherein said processor also automatically monitors based upon retrieved interface definition files, which retrieved interface definition files define referenced interfaces.

3. The computer system of claim 1 wherein the processor further comprises monitoring the selected device at poll interval persistence levels.

4. The computer system of claim 1 wherein the processor generates alarms at a plurality of thresholds.

5. A method for automatically monitoring simple network management protocol manageable devices comprising:

selecting devices to be monitored from among the simple network management protocol manageable devices of a network;

automatically discovering a device from among the selected devices that is available to be monitored;

determining a class of the discovered device in order to select a particular device definition for the discovered device;

determining the discovered device's unique interface characteristics based on its connectivity in the network;

retrieving device definition files that represent existing interfaces of the discovered device;

retrieving corresponding interface definition files;

creating a device-specific definitions data structure according to information in the device definition files and the interface definition files;

determining devices and interfaces to monitor according to the device-specific definitions data structure; and based on interface level connectivity of a device, monitoring the device and selected interfaces of the device with thresholds and threshold deviation persistence calculated from the device-specific definitions data structure.

6. The method of claim 5 further comprising the step of setting alarms.

7. The method of claim 6 wherein said alarms are set at one of a plurality of threshold values.

8. A method for automatically monitoring network manageable devices of a computer network comprising:

selecting network devices to be monitored from among the network manageable devices; automatically discovering at least one of the selected network devices that are available to be monitored;

determining a class for the at least one selected network device;

determining unique interface characteristics for the at least one selected network device based on the at least one selected network device's connectivity in the network;

retrieving device definition files that represent existing interfaces of the at least one selected network device;

retrieving corresponding interface definition files;

creating a device-specific definitions data structure according to information in the device definition files, and the interface definition files;

determining devices and interfaces to monitor according to the device-specific definitions data structure; and based on interface level connectivity of a device, monitoring the device and selected interfaces of the device using thresholds and threshold deviation persistence calculated from the device-specific definitions data structure.

9. The method of claim 8 further comprising the step of setting alarms.

10. The method of claim 9 wherein said alarms are set at one of a plurality of threshold values.

* * * * *